M. V. Nobles, Animal Exterminator.
Assigned to Self & John C. Nobles

No. 71,780 — Patented Dec 3 1867

Witnesses:
Theo Tusche
Wm. Truvin

Inventor:
M. V. Nobles
Per Munn & Co.
Attorneys

United States Patent Office.

M. V. NOBLES, OF ELMIRA, ASSIGNOR TO HIMSELF AND JOHN C. NOBLES, OF RUSHFORD, NEW YORK.

*Letters Patent No. 71,780, dated December 3, 1867.*

IMPROVED APPARATUS FOR EXTERMINATING VERMIN.

The Schedule referred to in these Letters Patent and making part of the same.

TO ALL WHOM IT MAY CONCERN:

Be it known that I, M. V. NOBLES, of Elmira, in the county of Chemung, and State of New York, have invented a new and improved Animal-Exterminator; and I do hereby declare that the following is a full, clear, and exact description thereof, which will enable those skilled in the art to make and use the same, reference being had to the accompanying drawings, forming part of this specification.

This invention relates to a new and improved method of exterminating animals or vermin which infest dwellings or buildings, or which prey upon vegetation, or which are in any manner a source of damage or annoyance to housekeepers, farmers, horticulturists, or others; and the invention consists in an arrangement whereby a current of annihilating-powders, gases, smoke, or vapors may be discharged in such a condition and in such a manner that the animals or vermin mentioned will be suffocated or destroyed when in contact therewith, as will be hereinafter described.

Figure 1:
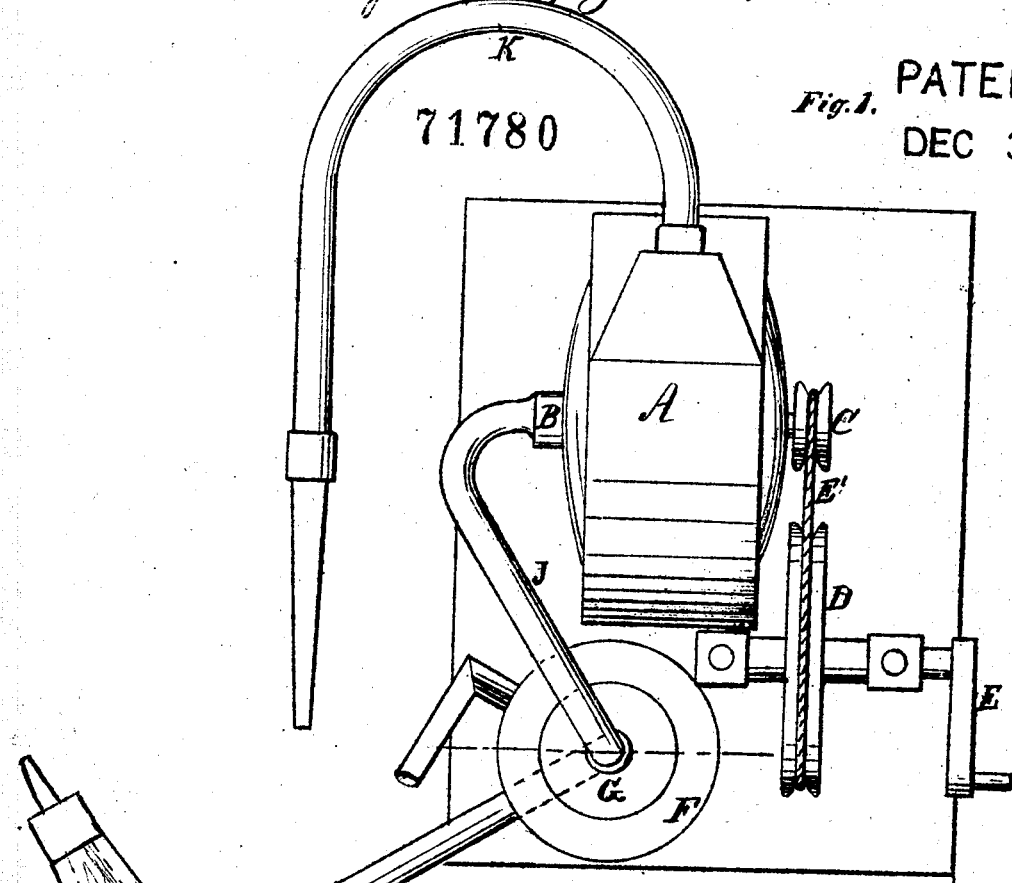
Figure 2:
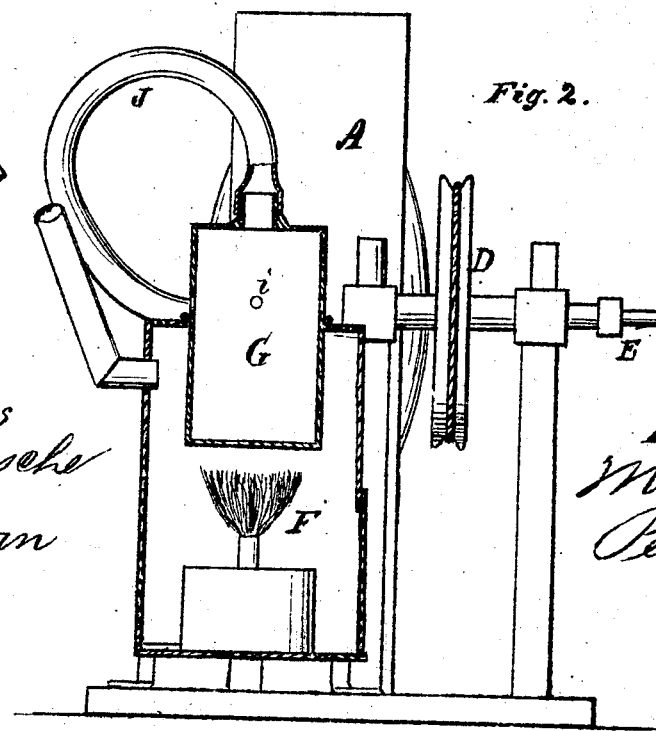

Figure 1 is a top or plan view of the machine.
Figure 2 is a front elevation of the same, partly in section.
Similar letters of reference indicate corresponding parts.

In carrying out my invention, I provide means for forcing or projecting exterminating-powders by a current of heated air or vapor, or a current of exterminating heated gas or other fluid, in contact with such animals, or on to the surfaces or into the recesses or holes occupied by such animals, such currents being forced or projected by a fan-blower, or by a bellows or a pump, or other device.

In this example of my invention a fan-blower is shown, in combination with a furnace and heating-vessel, with suitable tubes or pipes attached.

A represents the fan-blower, which is provided with wings upon a revolving shaft. B is the shaft. C is a pulley on the shaft. D is a driving-pulley or hand-wheel, which is revolved by the crank E. E' is the band or belt, by which motion is imparted to shaft B. F represents the furnace. G is the heating-vessel or pot which contains the powder or vapor to be discharged. J is a tube, which is attached to the top of the vessel G, by which the powder or vapor is conducted into the cylinder A. K is a tube, which is connected with the mouth of the fan-blower or cylinder A, through which the powder or vapor is forced or driven into cracks, holes, or recesses, or against surfaces, or in contact with the animals, for the purpose of destroying the said vermin.

The exterminating-powder, or liquid, or whatever substance may be used for the purpose, is placed in the vessel G over the fire in the furnace F, or in any other position so that the same may be heated to the desired temperature. When the wings in the blowing-cylinder are revolved, a vacuum or partial vacuum is produced in the cylinder by the expulsion of the air, and the powder or vapor or gases contained in the vessel G will rush into the cylinder, and be forced out through the tube or pipe K, as before mentioned.

The cylinder A is designed to be air-tight, allowing no air to enter except through the tube J, and none to escape excepting through the tube K. Atmospheric air is allowed to enter the vessel G through apertures above the furnace, as seen at *i*, which may be forced, either alone or in combination with other substances, as before mentioned. When found more convenient or desirable, a bellows or a pump, or any other suitable device, may be connected with the vessel G as a substitute for the fan-blower for producing the proper current and desired effect.

Having thus described my invention, I claim as new, and desire to secure by Letters Patent—

1. The fan-blower A, the furnace F, and the vessel G, with the parts thereunto connected, arranged, combined, and operating substantially as described for the purpose specified.

2. Forcing a current of heated gas, vapor, or air, either with or without annihilating-powders or other substances in combination therewith, from the vessel G, or its equivalent, substantially as and for the purposes described.

M. V. NOBLES.

Witnesses:
H. C. HIGMAN,
R. N. WATROUS.